(12) United States Patent
Beiter et al.

(10) Patent No.: US 10,637,650 B2
(45) Date of Patent: Apr. 28, 2020

(54) ACTIVE AUTHENTICATION SESSION TRANSFER

(71) Applicant: Hewlett-Packard Development Company, L.P., Houston, TX (US)

(72) Inventors: Michael Beiter, Fort Collins, CO (US); Matthew Messinger, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 136 days.

(21) Appl. No.: 15/521,698

(22) PCT Filed: Oct. 29, 2014

(86) PCT No.: PCT/US2014/062936
§ 371 (c)(1),
(2) Date: Apr. 25, 2017

(87) PCT Pub. No.: WO2016/068916
PCT Pub. Date: May 6, 2016

(65) Prior Publication Data
US 2017/0244555 A1    Aug. 24, 2017

(51) Int. Cl.
*H04L 9/08* (2006.01)
*H04L 9/32* (2006.01)
*G06K 19/06* (2006.01)

(52) U.S. Cl.
CPC ...... *H04L 9/0819* (2013.01); *G06K 19/06028* (2013.01); *H04L 9/3213* (2013.01);
(Continued)

(58) Field of Classification Search
CPC ... H04L 9/0819; H04L 9/3213; H04L 9/3234; H04L 9/3226; H04L 2209/34; G06K 19/06028
See application file for complete search history.

(56) References Cited

U.S. PATENT DOCUMENTS 8,627,438 B1 * 1/2014 Bhimanaik ............ H04L 63/10
726/9
2010/0070760 A1 * 3/2010 Vanderveen ........ H04L 63/0823
713/156
(Continued)

FOREIGN PATENT DOCUMENTS

EP    2658297    10/2013

OTHER PUBLICATIONS

Krishnakumar et al., "Seamless session mobility using short range communication technologies," 2014 IEEE International Conference on Communications (ICC) Year: 2014 | Conference Paper | Publisher: IEEE.*

(Continued)

*Primary Examiner* — Roderick Tolentino
(74) *Attorney, Agent, or Firm* — Mannava & Kang (57) ABSTRACT

In an example, an active authentication session may b transferred from a first device to a second device. An authentication server may store a new authentication session token for the second device in session storage. The new authentication session token may be derived from an active authentication session token that was received from the first device. The authentication server may also receive an identification value from the first device, which was obtained from the second device, in response to verifying a query by the second device regarding an existence of a locator key based on the identification value in the session storage, the new authentication session token may be transmitted to the second device.

11 Claims, 8 Drawing Sheets

(52) U.S. Cl.
CPC .......... *H04L 9/3226* (2013.01); *H04L 9/3234* (2013.01); *H04L 2209/34* (2013.01)

(56) References Cited

U.S. PATENT DOCUMENTS

| | | | |
|---|---|---|---|
| 2011/0138453 A1* | 6/2011 | Verma | H04L 63/0815 726/8 |
| 2012/0077442 A1 | 3/2012 | Piazza et al. | |
| 2012/0079081 A1 | 3/2012 | Parks et al. | |
| 2013/0141747 A1 | 6/2013 | Oba et al. | |
| 2013/0212663 A1* | 8/2013 | Edge | H04W 12/06 726/7 |
| 2013/0219479 A1 | 8/2013 | Desoto et al. | |
| 2013/0221084 A1 | 8/2013 | Doss et al. | |
| 2013/0283363 A1* | 10/2013 | Rautenberg | G06F 21/31 726/7 |
| 2014/0122730 A1* | 5/2014 | Burch | H04L 67/146 709/228 |
| 2014/0173125 A1 | 6/2014 | Selvanandan | |
| 2014/0189839 A1* | 7/2014 | Jezek | H04L 63/0815 726/8 |
| 2014/0230023 A1 | 8/2014 | Parks | |
| 2014/0359709 A1* | 12/2014 | Nassar | H04L 63/08 726/4 |
| 2015/0020185 A1* | 1/2015 | McDonough | H04L 67/02 726/9 |
| 2015/0381595 A1* | 12/2015 | Shoshan | H04L 63/08 726/7 |

OTHER PUBLICATIONS

Bamdadian et al., "Improving session-to-session transfer performance of motor imagery-based BCI using adaptive extreme learning machine," 2013 35th Annual International Conference of the IEEE Engineering in Medicine and Biology Society (EMBC) Year: 2013 | Conference Paper | Publisher: IEEE.*
Nuance Safecom Smart Printing, (Web Page), date unknown—2 pages—http://via.safecom.eu/.

* cited by examiner

ACTIVE AUTHENTICATION SESSION TRANSFER

BACKGROUND

Network-based service users may provide credentials to the service for use in authenticating the identity of the user and determining that the user is authorized to access various resources of the service. For example, users of these network-based services may provide credentials such as a username and password to a computing device before the service can be accessed. For greater security, the user may enter the user's credentials each time the user interacts with a different computing device, or repeatedly accesses the same device, in order to access the service.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are examples of transferring an active authentication session between devices. Such examples may provide a single sign-on solution whereby a user may access an application through multiple devices. The multiple devices, for instance, may not be part of a same trust domain (e.g., not in the same Wifi™ network, Bluetooth™ connection, etc.), and thus, may not have an established trust relationship. Accordingly, the examples may allow a user to use advanced login mechanisms with a device that does not natively support such login mechanisms and may increase user convenience by allowing the user to securely reuse a previously established active authentication session.

According to an example, an active authentication session may be transferred from a first device (e.g., a mobile device) to a second device (e.g., a multifunction printer (MFP)) by generating an identification value, and an encryption key. The identification value may be any suitable arbitrary string. For example, the identification value may be a nonce ("number used once"). In some examples, a nonce may be a string created using a cryptographically secure pseudo-random number generator. The identification value and the encryption key may then be encoded in a format for output by the second device, such as a bar code (e.g., a QUICK RESPONSE (QR) code), datagram, or other machine readable code for display on the second device.

In response to the first device acquiring of the identification value and the encryption key from the displayed output of the second device, the authentication server may receive an active authentication session token, the identification value, and the encryption key from the first device. The active authentication session token, for instance, may have been previously stored in the first device. The identification value and the encryption key, for instance, may be obtained or extracted from the displayed output of the second device. A new authentication session token may be derived for the second device based on the active authentication session token. This new authentication session token may be encrypted with the encryption key and stored in session storage of the authentication server in association with a locator key based on the identification value. Meanwhile, the second device may repeatedly query the authentication server to determine whether the locator key is stored in session storage. In response to the query, the authentication server may verify that the locator key is indeed stored in the session storage. Accordingly, the authentication server may transmit the encrypted new authentication session token to the second device.

Certain client devices, such as MFPs, may provide access to a variety of cloud based web applications and services. However, cost and size constraints may make it inconvenient for a user to enter information on client devices. For instance, the client devices may have limited input interfaces that include soft keyboards in small touchscreens and small physical keyboards with single keys being used for several input characters. When a user wants to use a cloud application or service, the user may enter their credentials to authenticate every time they are interacting with the client device. This can be extremely inconvenient, in particular if the user accesses the client device frequently. Moreover, the incorporation of additional hardware, such as Bluetooth™, NFC, biometrics (e.g., fingerprint authentication), etc, in client devices to support authentication may increase the research and development, manufacturing and support costs of the client devices.

Generally speaking, the disclosed examples allow a user to conveniently enter their credentials on the mobile device and then transfer the authenticated session to the client device without loss of security. Additionally, the disclosed examples may leverage generic soft token clients in the form of applications that operate on any mobile device platform. Accordingly, when using advanced authentication mechanisms, such as biometric mechanisms or cryptographic protocols, the user may install an application on their mobile device that interacts with standard hardware supported by the mobile device without needing additional dedicated hardware.

Moreover, the authentication server of the disclosed examples may audit all user activities including an audit trail of what tokens a user has created and when they were created. Accordingly, a user may have a central overview of their currently open sessions, and may revoke them on a per-device basis. Further, the dynamically generated identification values and encryption keys of the disclosed examples may be unique, which increases their overall security. According to the disclosed examples, the authentication server and the client devices may not persistently store any confidential information that would allow an attacker to impersonate a user. That is, all valuable information (e.g., session tokens, identifiers, cryptographic keys) may be held in volatile memory only according to an example.

Figure 1:
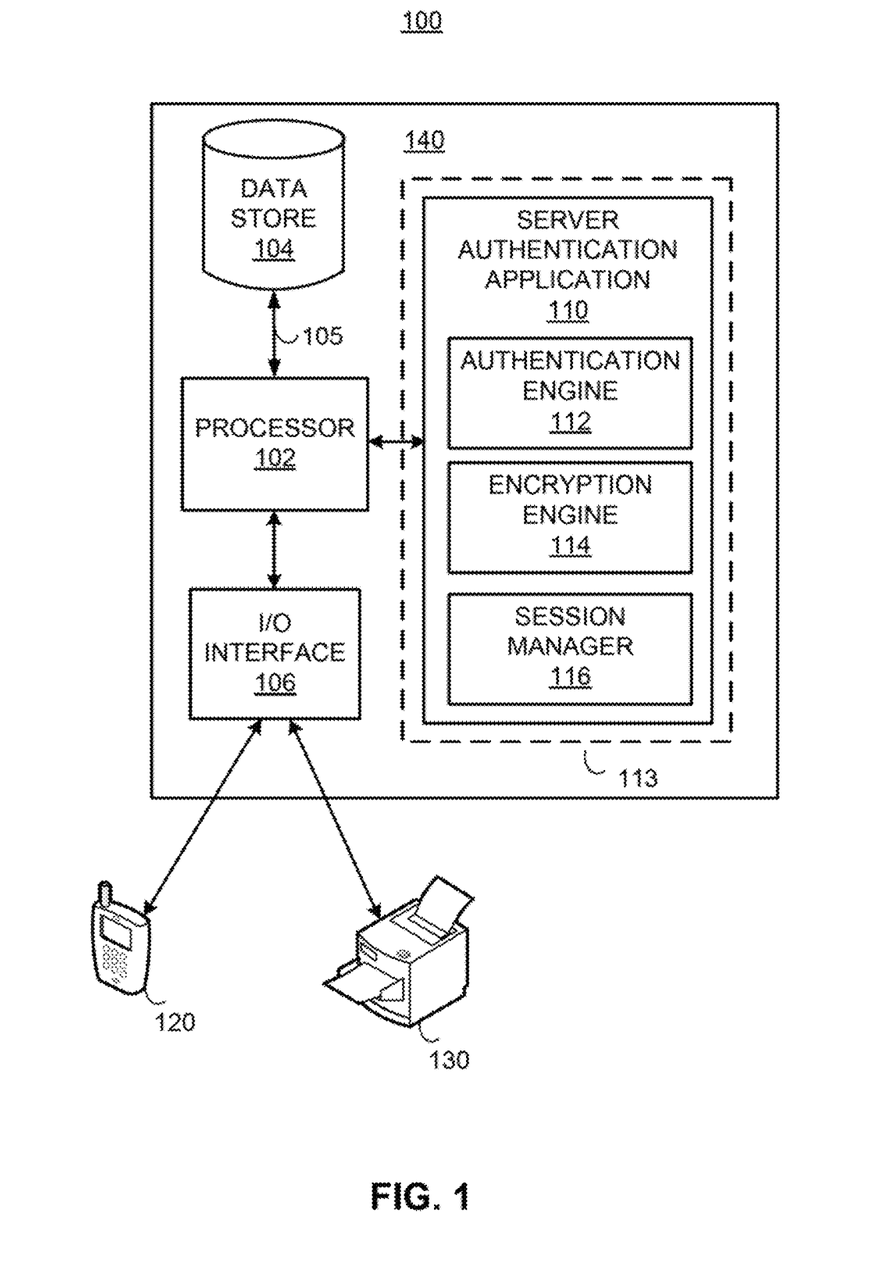
FIG. 1 shows a block diagram of an authentication session transferring system, according to an example of the present disclosure.

With reference to FIG. 1, there is shown a block diagram of an authentication session transferring system 100, according to an example of the present disclosure. It should be understood that the authentication session transferring system 100 may include additional components and that one or more of the components described herein may be removed and/or modified without departing from a scope of the authentication session transferring system 100.

The authentication session transferring system 100 may include a mobile device 120 a client device 130 and an authentication server 140. The mobile device 120 may be any portable computing device with Internet capabilities that is to access data, e.g., machine readable codes, such as quick response (QR) codes or datagrams, outputted by the client device 130. For instance, the mobile device 120 may be a smartphone, a tablet, a laptop, a wearable computing device, etc., that includes a scanning authentication application and a scanning hardware. The client device 130 may be a multifunction printer (MFP) or any other printing device (e.g., printer, copier, etc.) or computing device. The authentication server 140 may be a remote server that runs an authentication application 110 or service that provides authenticated access on the client device 130. The authentication server 140, for example, may be a remote server in a network cloud that runs a cloud service utilized by the client device 130. Although the authentication server 140 is shown as a single server in FIG. 1, the authentication server 140 may be implemented by more than one server.

The authentication server 140 is depicted as including a processor 102, a data store 104, an input/output (I/O) interface 106, and an authentication application 110. For example, the authentication server 140 may be a desktop computer, a laptop computer, a smartphone, a computing tablet, or any other type of computing device. The authentication server 140 may store or manage high-dimensional data in a separate computing device, for instance, through a network device, which may include, for instance, a router, a switch, a hub, and the like. The data store 104 may include physical memory such as a hard drive, an optical drive, a flash drive, an array of drives, or any combinations thereof, and may include volatile and/or non-volatile data storage. According to an example of the authentication server 140, the data store 104 may be a session storage for storing encrypted authentication session tokens in association with locator keys.

The processor 102, which may be a microprocessor, a micro-controller, an application specific integrated circuit (ASIC), or the like, is to perform various processing functions in the authentication server 140. In an example, the server authentication application 110 includes machine readable instructions stored on a non-transitory computer readable medium 113 and executable by the processor 102. Examples of the non-transitory computer readable medium 113 may include dynamic random access memory (DRAM), electrically erasable programmable read-only memory (EE-PROM), magnetoresistive random access memory (MRAM), memristor, flash memory, hard drive, and the like. The computer readable medium 113 may be included in the data store 104 or may be a separate storage device. In another example, the server authentication application 110 includes a hardware device, such as a circuit or multiple circuits arranged on a board. In this example, the server authentication application 110 may be circuit components or individual circuits, such as an embedded system, an ASIC, or a field-programmable gate array (FPGA).

The processing functions of the server authentication application 110 may include the functions of an authentication engine 112, an encryption engine 114, and a session manager 116. The authentication engine 112, for instance, may derive an authentication session token for the client device 130 upon receiving an active authentication session token from the mobile device 120. The encryption engine 114, for instance, may encrypt the authentication session token for the client device 130 to prevent unauthorized devices from using the encrypted authentication session token. The session manager 115, for instance, may organize and store the encrypted authentication session tokens for the client device 130 in the data store 140. The encrypted authentication session tokens may be stored in association with a locator key based on identification values for an active authentication session.

The processor 102 may be coupled to the data store 104 and the I/O interface 106 by a bus 105, where the bus 105 may be a communication, system that transfers data between various components of the authentication server 140. In examples, the bus 105 may be a Peripheral Component Interconnect (PCI), Industry Standard Architecture (ISA), PCI-Express, HyperTransport®, NuBus, a proprietary bus, and the like.

The I/O interface 106 includes a hardware and/or a software interface. The I/O Interface 106 may be a network interface connected to a network through a network device, over which the server authentication application 110 may receive and communicate information. For example, the Ifs interface 106 may be a wireless local area network (WLAN) or a network interface controller (NIC). The WLAN may link the computing device 200 to a network device through a radio signal. Similarly, the NIC may link the authentication server 140 to a network device through a physical connection, such as a cable. The authentication server 140 may also link to a network device through a wireless wide area network (WWAN), which uses a mobile data signal to communicate with mobile phone towers. The processor 102 may store information received through the I/O interface 108 in the data store 104 and may use the information in implementing the server authentication application 110. According to another example, the I/O interface 106 may be a device interface to connect the authentication server 140 to one or more devices. I/O devices may include, for example, a display, a keyboard, a mouse, and a pointing device, wherein the pointing device may include a touchpad or a touchscreen. The I/O devices may be built-in components of the authentication server 140, or located externally to the authentication server 140. The display may be a display screen of a computer monitor, a smartphone, a computing tablet, a television, or a projector.

Figure 2A:
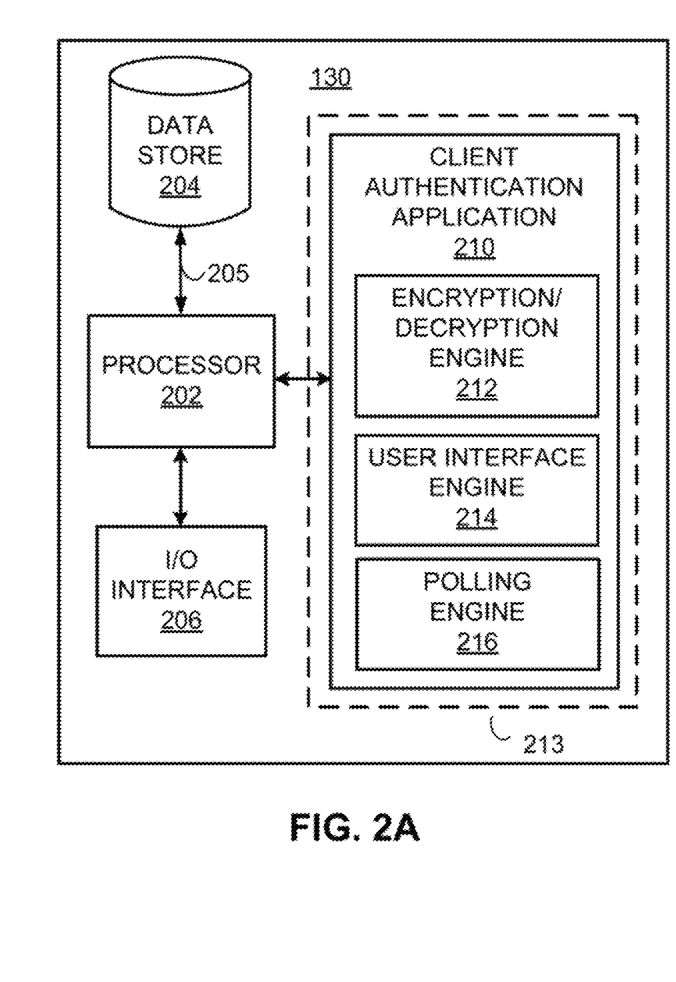
FIG. 2A shows a block diagram of a client device for receiving a transferred active authentication session, according to an example of the present disclosure.

With reference to FIG. 2A, there is shown a block diagram a client device 130 for receiving an active authentication session, according to an example of the present disclosure. It should be understood that the client device 130 may include additional components and that one or more of the components described herein may be removed and/or modified without departing from a scope of the client device 130. According to an example, the client device 130 may be any computing device with a user interface that prompts a user to login to the authentication server 140 to run a client authentication application 210 on the client device 130.

The client device 130 is depicted in FIG. 2A as including a processor 202, a data store 204, a bus 205, and an I/O interface 206. These components may be similarly implemented as described above in FIG. 1 with respect to the processor 102, the data store 104, the bus 105, and the I/O interface 106. In an example, the client authentication application 210 includes machine readable instructions stored on a non-transitory computer readable medium 213 and executable by the processor 202. The processing functions of the client authentication application 210 may include the functions of an encryption/decryption engine 212, a user interface engine 214, and a polling engine 216. The encryption/decryption engine 212, for instance, may encrypt and decrypt authentication session tokens. Additionally, the encryption/decryption engine 212 may generate an identification value and an encryption key that may be encoded into a format for output to the client device 130. The user interface engine 214, for instance, may display the generated identification value and the encryption key on a user interface of the client device 130. According to an example, the generated identification value and the encryption key may be encoded in a format such as a bar code, datagram, or other machine readable code for output on the client device 130. The polling engine 216, for instance, may repeatedly inquire the authentication server 140 to determine whether a particular user is authenticated to access the client device 130.

Figure 2B:
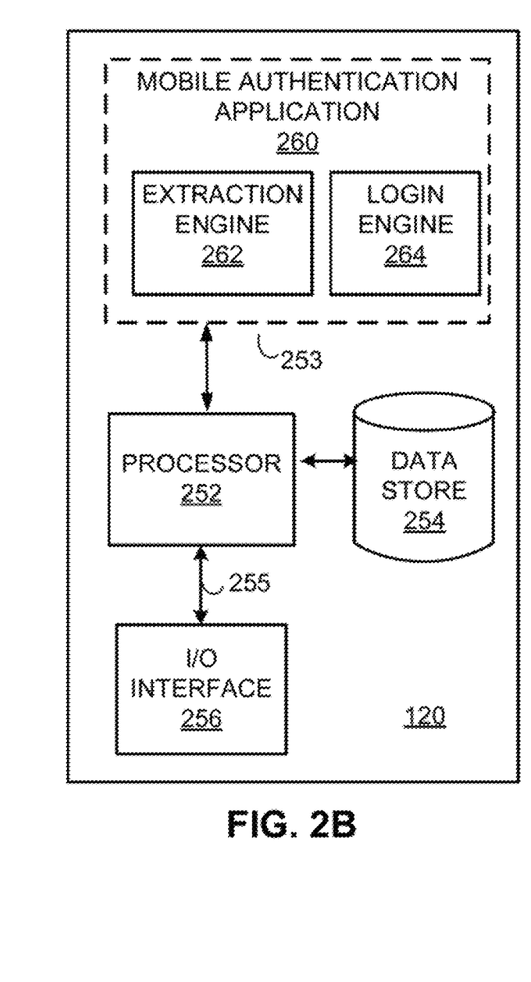
FIG. 2B shows a block diagram of a mobile device for transferring an active authentication session, according to an example of the present disclosure.

With reference to FIG. 2B, there is shown a block diagram of a mobile device 120 for transferring an active authentication session, according to an example of the present disclosure. It should be understood that the mobile device 120 may include additional components and that one or more of the components described herein may be removed and/or modified without departing from a scope of the mobile device 120. According to an example, the mobile device 120 may be any portable computing device with Internet capabilities that is to access data, e.g., machine readable codes, such as QR codes, outputted by the client device 130.

The mobile device 120 is depicted in FIG. 2B as including a processor 252, a data store 254, a bus 255, and an I/O interface 256. These components may be similarly implemented as described above in FIG. 1 with respect to the processor 102, the data store 104, the bus 105, and the I/O interface 106. In an example, the mobile authentication application 260 includes machine readable instructions stored on a non-transitory computer readable medium 253 and executable by the processor 252. The processing functions of the mobile authentication application 260 may include the functions of the extraction engine 262 and the login engine 264. The extraction engine 262, for instance, may extract data from bar codes, datagrams, or other machine readable codes. For example, the extraction engine 262 may scan a QR code to extract an identification value and an encryption key. The login engine 264, for instance, allows a user to access the mobile device 120 with a manual entry of authentication credentials (e.g., username/password based authentication).

Figure 3:
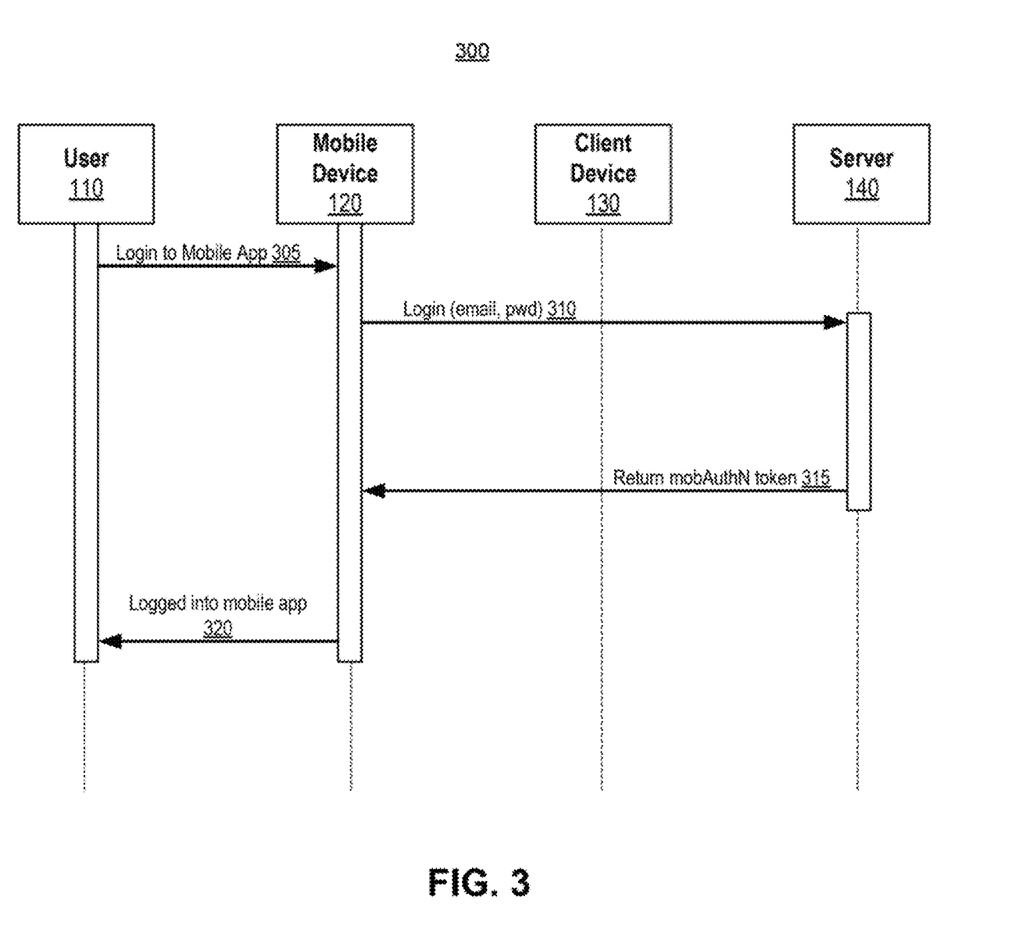
FIG. 3 shows a bounce diagram of a method for a user to login to an authentication application on a mobile device, according to an example of the present disclosure.

With reference to FIGS. 1-3, a user may transfer an active authentication session from the mobile device 120 to the client device 130, which may not be part of a same trust domain (e.g., not in the same Wifi™ network, without a Bluetooth™ connection, etc.) with the mobile device 120 and may not yet have an established trust relationship with the mobile device 120. Through implementation of examples disclosed herein, the user may log in once at the mobile device 120 to gain access to each of a plurality of individual client devices 130 without being prompted to enter credentials again at each of the plurality of independent client devices.

For example, the user may log in to the mobile device 120 by, manual entry of authentication credentials an installed mobile authentication application 260 on the mobile device 120. The authentication server 140 may receive the authentication credentials from the mobile device 120, validate the received authentication credentials, and transmit a mobile authentication token (i.e., mobAuthN) to the mobile device 120. The mobile device 120 may store, the mobile authentication token in the data store 254.

The user may then approach the client device 130 in which the user would like to access and open a browser on the user interface (UI) on the client device 130. As the user is not yet logged in to the client device 130, the client device 130 may display a machine readable code, such as a QR code, on a login page displayed on the UI of the client device 130 or may output a datagram containing similar information, According to an example, the client device 130 may acquire an arbitrary QR-ID and an arbitrary QR-ENC encryption key that is generated and encoded into a QR code by the authentication server 140. Alternatively, the client device 130 may create the QR-ID and the QR-ENC encryption key and submit the QR-ID and QR-ENC to the authentication server 140. Regardless, the client device 130 may display a login page with the QR code that includes the QR-ID and QR-ENC that is generated at the client device 130 or returned from the authentication server 140.

The user 110 may scan the QR code that is displayed on the UI of the client device 130 with the mobile device 120. The mobile device 120 may extract the QR-ID and QR-ENC from the QR code and send the QR-ID, QR-ENC, and the mobile authentication token to the authentication server 140 for authentication. The authentication server 140, for example, may validate the mobile authentication token and derive a device authentication token based on the mobile authentication token. Alternatively, the authentication server 140 may store the mobile authentication token in a data store or create an intermediary token. In this regard, the authentication server 140 may later derive the device authentication token from the stored mobile authentication token or the intermediary token. The authentication server 140 may then encrypt the device authentication token using QR-ENC as the encryption key, and store the result of the encryption in a row of a session table in the data store 104 (e.g., session store), using the QR-ID as the locator key. Meanwhile, the client device 130 may repeatedly inquire or poll the authentication server 140 to determine whether the locator key that is based on the QR-ID is stored in the data store 104. Accordingly, in response to the authentication server 140 detecting and verifying that the locator key in the session table of the data store 104, the authentication server 140 may transmit the encrypted device authentication token to the client device 130.

Thus, according to an example of the present disclosure, the user may be fully authenticated on the client device 130 by transferring an active authentication session from the mobile device 120. Hence, for example, the user may log in via manual entry of credentials only once at the mobile device 120, and gain access to the client device 130 without manually entering credentials at the device 130.

Figure 5:
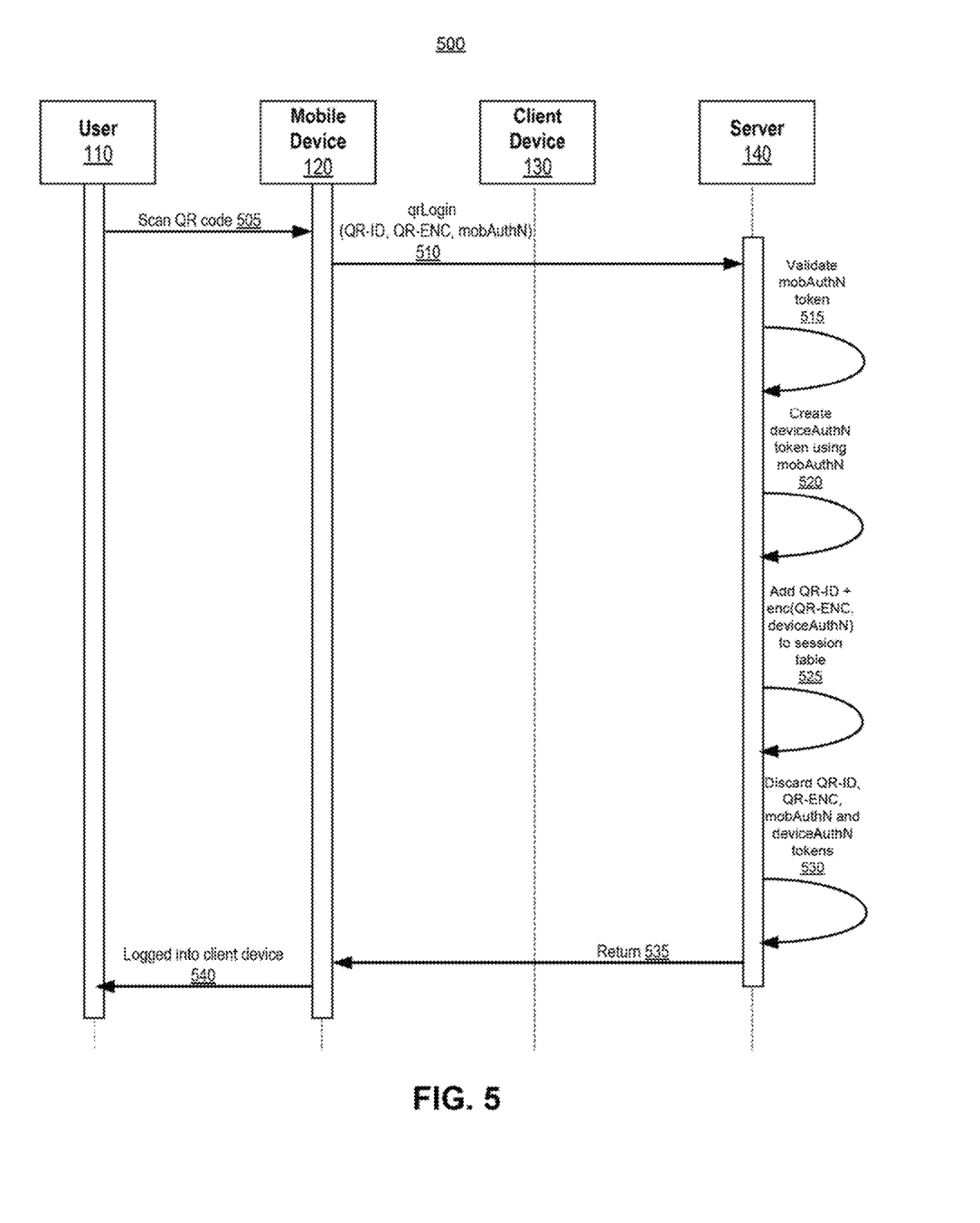
FIG. 5 shows a bounce diagram of a method for logging into a client device using a mobile device, according to an example of the present disclosure.
Figure 6:
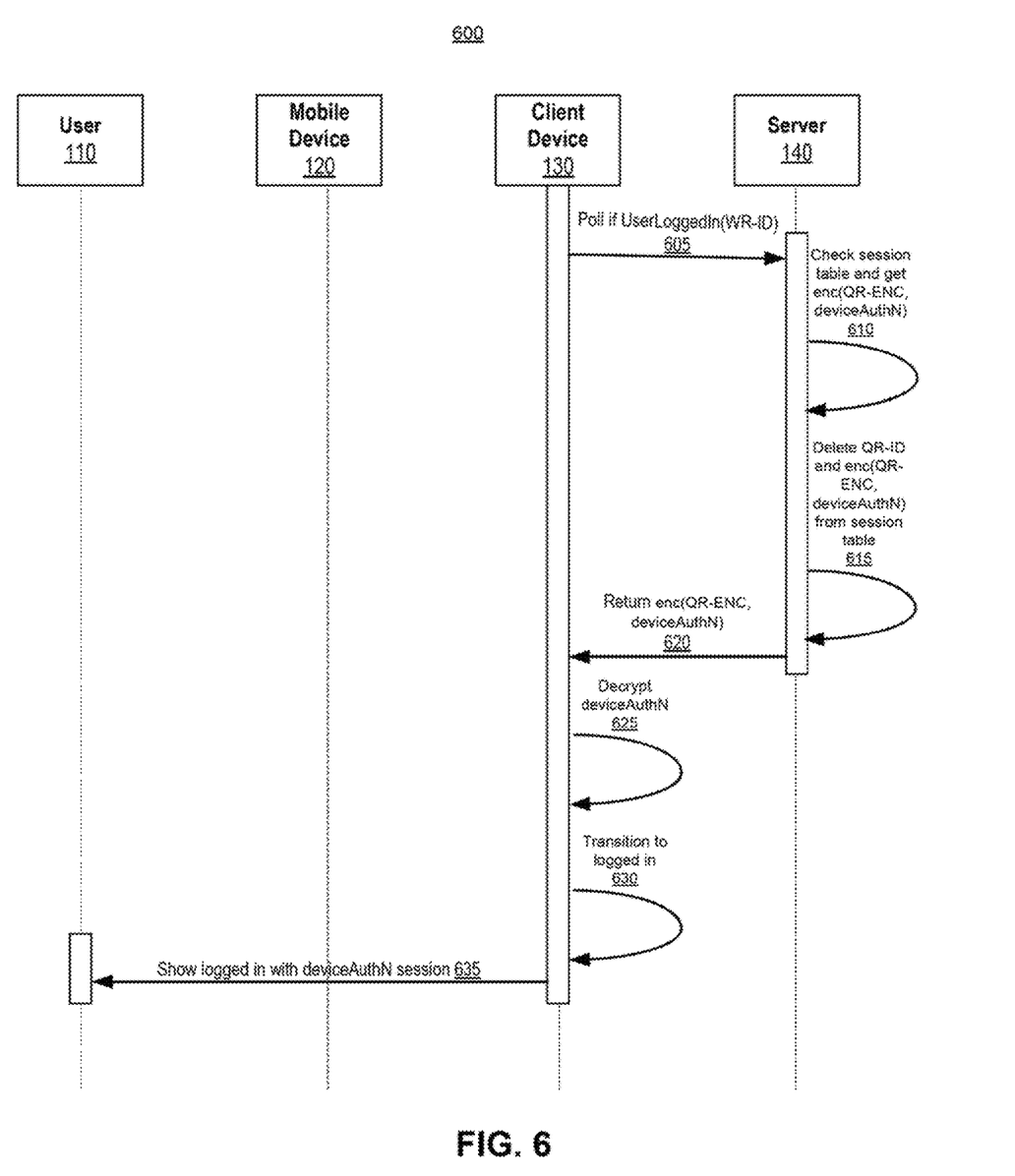
FIG. 6 shows a bounce diagram of a method for a client device to poll the authentication server to determine if a user is authenticated, according to an example of the present disclosure.
Figure 7:
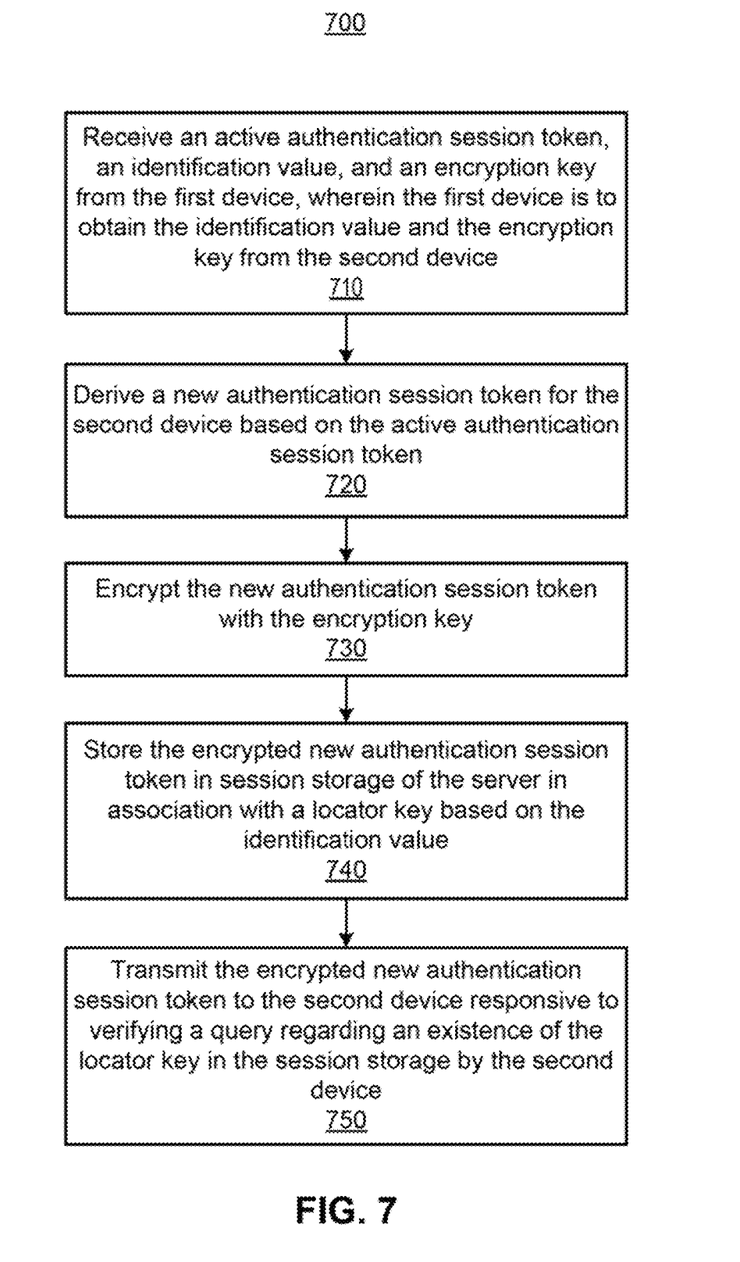
FIG. 7 shows a flow chart of a method for an authentication server to transfer an active authentication session from a first device to a second device, according to an example of the present disclosure.
Figure 8:
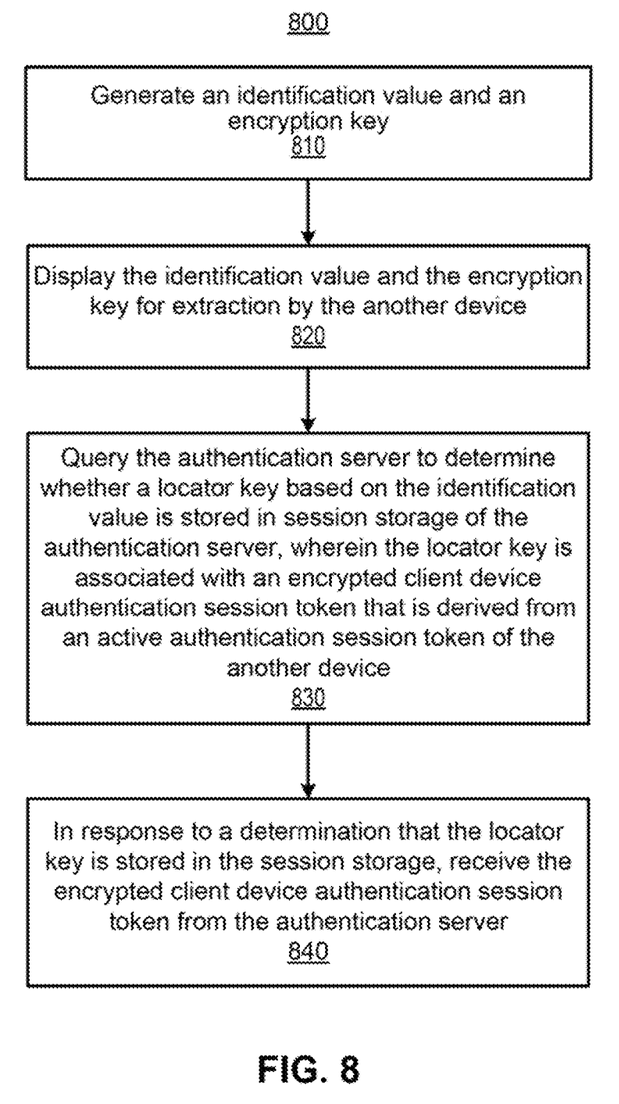
FIG. 8 shows a flow chart of a method for client device to receive an active authentication session between a first device and an authentication server, according to an example of the present disclosure.

FIGS. 3-6 respectively depict bounce diagrams and FIGS. 7 and 8 respectively depict flow diagrams of methods 300-800 for transferring an active authentication session between devices according to examples of the present disclosure. It should be apparent to those of ordinary skill in the art that the methods 300-800 represent generalized illustrations and that other operations may be added or existing operations may be removed, modified or rearranged without departing from the scopes of the methods 300-800.

With reference first to FIG. 3, there is shown a bounce diagram of a method 300 for a user 110 to log in to an authentication application on a mobile device 120, according to an example of the present disclosure.

As shown in arc 305, a user 110 may attempt to login to an application on the mobile device 120. The user, for example, may enter credentials such as a username (e.g., email address) and a password into a graphical user interface of the mobile device 120 to log in to the application on the mobile device 120. The username and password may then be transmitted to the authentication server 140 for authentication as shown in arc 310. The disclosed method 300, however, is not limited to a username and password based login for authentication and may include any authentication mechanism supported by the mobile device 120. Examples of other authentication mechanisms include x509 software tokens, one-time password generators, and biometric authentication, which may utilize additional hardware attached to the mobile device 120.

As shown in arc 315, once the user 110 has been authenticated by the authentication server 140, the authentication server 140 creates a mobile authentication token (i.e., mobAuthN token) and returns the mobile authentication token to the mobile device 120. The mobile authentication token, for instance, may be a Security Assertion Markup Language (SAML) token or another form of session token. The user 110 is now authenticated as defined in the mobile authentication token and logged into the application on the mobile device 120, as shown in arc 320.

Figure 4:
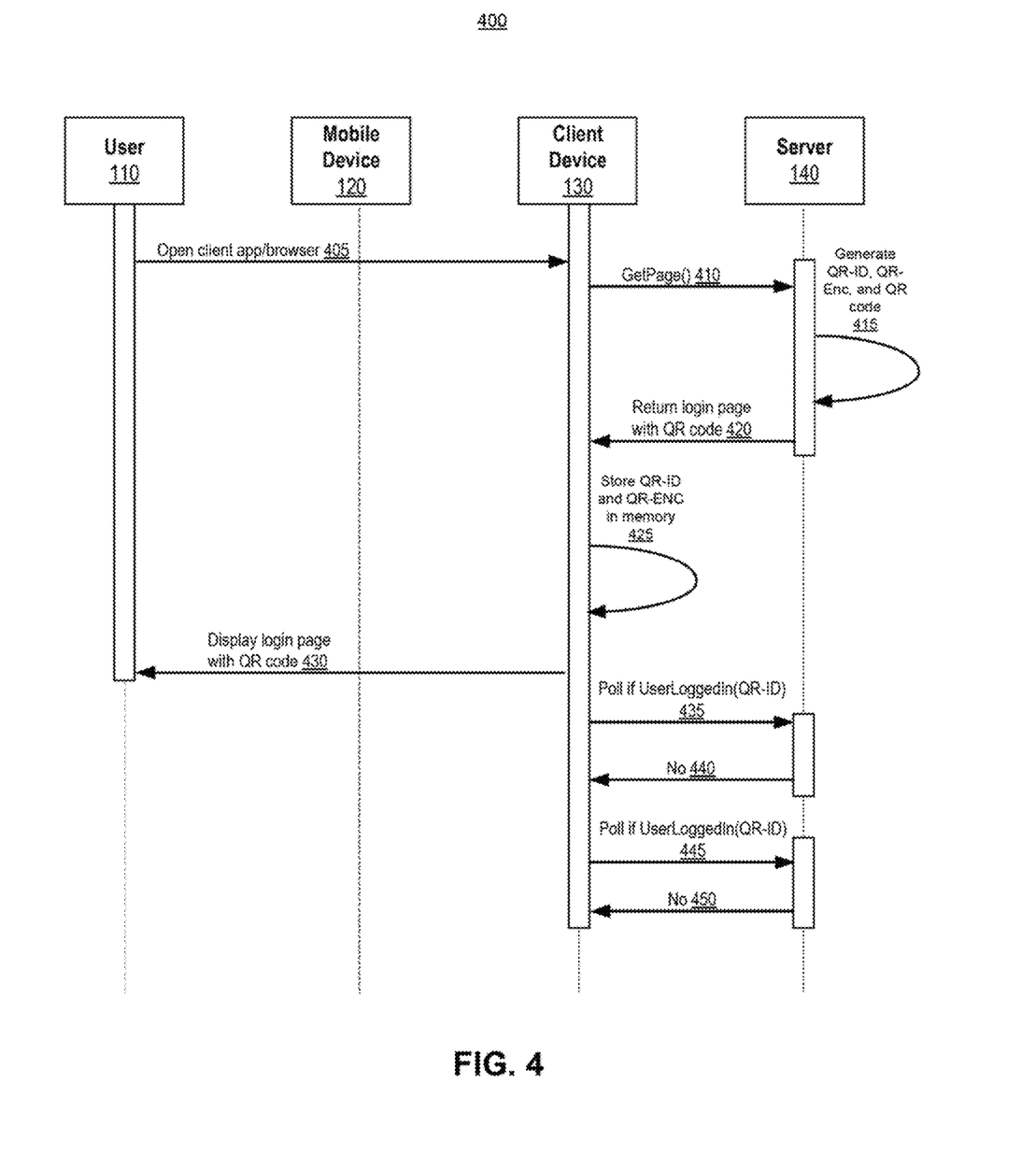
FIG. 4 shows a bounce diagram of a method for generating a machine readable bar code, according to an example of the present disclosure.

FIG. 4 shows a bounce diagram of a method 400 for generating a machine readable bar code, according to an example of the present disclosure. The machine readable bar code may, for instance, be a QR code that is displayed on a login page on a display of the client device 130.

As shown in arc 405, the user 110 may open an authentication application (or a browser) on the client device 130. In response to the user 110 opening the authentication application, the client device 130 may retrieve and launch a login page (i.e., GetPage( )) that is hosted in the authentication server 140 (e.g., a cloud web application), as shown in arc 410. The authentication server 140 may recognize that the user 110 has not been authenticated at this point and determine by a mechanism (e.g., a flag that is set by the client device 130) that QR code based login is supported by the client device 130.

At arc 415, the authentication server 140 may generate an identification value (e.g., nonce) of high entropy. This identification value is called a "QR-ID". The authentication server may also create an arbitrary encryption key, called a "QR-ENC". According to an example, both QR-ID and QR-ENC are encoded in a QR code. The QR code may be embedded in a response hypertext markup language (HTML) page that is returned as the login page, as shown in arc 420. This response may also include QR-ID and QR-ENC in an encoded text representation that is only visible to the client device 130, and is not included in the login page. According to another example, both the QR-ID and QR-ENC may be created on the client device 130. In this example, the client device 130 would send the QR-ID and QR-ENC to the authentication server 140. In such examples, the client device 130 may include and utilize a pseudo-random number generator of sufficient quality.

As shown in arc 425, the client device 130 may store the QR-ID and QR-ENC in a local memory for later decryption. For example, the QR-ENC may be stored in an MFP session so that the locally cached QR-ENC is destroyed if the user 410 hits a reset button on the MFP, closes the authentication application on the MFP, closes the browser, etc. The client device 130 may then display the login page with the QR code to the user 110, as shown in arc 430.

In a parallel thread, the client device 130 may repeatedly poll the authentication server 140 to check for a server side status change associated with QR-ID (i.e., UserLoggedIn (QR-ID)), as shown in arcs 435 and 445. Until the user 110 has transferred the authentication session as discussed further below in FIG. 5, the authentication server 140 will return a "no" response indicating that the user 110 is not authenticated, as shown in arcs 440 and 450. However, once the user 110 has successfully transferred the authentication session as discussed further with respect to FIG. 5, the user's status may be changed from "user is not authenticated" to "user is authenticated" at the authentication server 140. A predetermined polling interval may determine the user experience. For instance, the shorter the polling interval, the faster the user 110 may be authenticated on the client device 130 after the use has scanned the QR code with the mobile device 120. However, a faster user authentication may place a greater load on the authentication server 140.

In method 400, the user 110 does not provide any secret information to the client device 130, but just initiates a workflow that eventually utilizes the QR-ID and QR-ENC. As noted above, the QR-ID could be created on the client device 130, however, creating the QR-ID on the authentication server 140 may yield better entropy. Data sent from the authentication server 140 in method 400 is independent from method 300. Accordingly, through implementation of the method 400, the user 110 may walk up to and use any of a plurality of client devices 130 without having to directly log into the client devices 130.

FIG. 5 shows a bounce diagram of a method 500 for logging into a client device 130 using a mobile device 120, according to an example of the present disclosure. Particularly, the method 500 may allow a user 110 to log in to the client device 130 by scanning, with the mobile device 120, a QR code that is displayed on the client device 130.

As shown in arc 505, the user 110 may scan the QR code that is displayed on the client device 130 using the authentication application on their mobile device 120. Once the user 110 has scanned the QR code with their mobile device 120, the authentication application extracts the QR-ID and QR-ENC from the QR code. At arc 510, the authentication application then sends the QR-ID, QR-ENC, and the mobile authentication token (i.e., mobAuthN), which was obtained in arc 315 in FIG. 3, to the authentication server 140 (e.g., qrLogin(QR-ID, QR-ENC, mobAuthN)). The authentication server 140, for example, may map the QR-ID to the mobile authentication token. Accordingly, the mobile device 120, the client device 130, and the authentication server 140 share a common secret QR-ID. In this regard, for instance, the mobile device 120 may be used to broker the relationship between the mobile device 120, the client device 130, and the authentication server 140.

When the authentication server 140 receives the mobile authentication token from the mobile device 120, the authentication server 140 may validate the mobile authentication token and ensure that the associated session is still valid, as shown in arc 515. According to an example, the authentication server 140 then creates a new session for the client device 130 that is derived from the session represented by the mobile authentication token, as shown in arc 520. The new session, for instance, is represented by a device authentication token (i.e., deviceAuthN).

As shown in arc 525, the authentication server 140 may encrypt the device authentication token using QR-ENC as the encryption key, and may store the result of the encryption (e.g., enc(QR-ENC, deviceAuthN)) in a temporary key/value store (e.g., a session able), using QR-ID as the locator key in the key/value store.

According to an example, the authentication server 140 may discard the QR-ID, QR-ENC, and the mobile authentication and device authentication tokens as shown in arc 530, and may confirm to the mobile device 120 that the discard operation was successful. By not persisting and discarding the cryptographic key QR-ENC from the authentication server storage 145, the method 500 may ensure that no confidential data is stolen if the authentication server 140 is breached by an attacker.

The authentication server 140 may then return a successful login message to the mobile device 120 as shown in arc 535. Accordingly, the mobile device 120 may display a message to the user 110 that they have been logged into the client device 130 as shown in arc 540.

FIG. 6 shows a bounce diagram of a method 600 for a client device 130 to poll the authentication server 140 to determine if a user 110 is authenticated, according to an example of the present disclosure. As discussed above in FIG. 4, in a parallel thread, the client device 130 may repeatedly poll the authentication server 140 to check for a server side status change associated with QR-ID (i.e., User-LoggedIn(QR-ID)) that indicates whether the user 110 has been authenticated. This polling process is described in greater detail with reference to the method 600 in FIG. 6 below.

At arc 605, the client device 130 may poll the authentication server 140 to determine if the user 110 has logged in a parallel thread. That is, for instance, the client device 130 may poll or request a status update from the authentication server 140 regarding the authentication status of the user 110. As discussed above, once method 500 has been completed, the authentication server 140 has a record of a QR-ID mapping to an encrypted value in its session table. According to an example, the authentication server 140 no longer has access to the decryption key, and is hence not able to decrypt the mobile authentication token data stored in the authentication server data store 145.

As shown in arc 610, in response to the client device 130 polling the authentication server 140 for a status update on the authentication of the user 110, the authentication server 140 may check the session table (e.g., key/value store) for a row identified by the QR-ID. According to an example, the row identified by the QR-ID includes the device authentication token encrypted with QR-ENC (e.g., enc(QR-ENC, deviceAuthN) that was generated at arc 520 in FIG. 5. If the authentication server 140 finds the QR-ID in the session table, the authentication server 140 purges or deletes the row identified by QR-ID from its database, as shown in arc 615, and then returns the content mapped to QR-ID (e.g., enc(QR-ENC, deviceAuthN), which is the device authentication token encrypted with the QR-ENC encryption key to the client device 140, as shown in arc 620.

At arc 625, the client device 130 decrypts the device authentication token using the QR-ENC cryptographic key obtained in arc 425 in FIG. 4. The client device is now fully authenticated with the device authentication session, and the client device may begin to transition to a logged in state as shown in arc 630. Accordingly, the client device 130 may transmit the device authentication token that represents the device authentication session to the user 110 (e.g., in the form of a cookie) for later use and display that the user is logged in to the client device 130 as shown in arc 635.

Thus, in method 600, the client device 630 may inquire or poll the authentication server 140 to retrieve a device authentication token by proving that that the client device 630 knows the secret QR-ID. The mobile authentication token may be validated and a specific device authentication token may be created to allow server side control for auditing and token redundancy, and to create the device authentication token according to the client device's specifications Method 600 completes the transfer of the mobile authentication token from the mobile device to the client device 130, whereby the mobile authentication token is secured by the QR-ID as a shared secret. Methods 300-600 may be, implemented without a high level of trust on either the mobile device 120 or the client device 130. That is, the cryptography operations may be performed on a fully trusted authentication server 140. According to an example, methods 300 or 400 may also be a server initiated communication (e.g., if there is an open management channel through a firewall).

With reference to FIG. 7, there is shown a flow chart of a method 700 for an authentication server 140 to transfer an active authentication session from a first device (e.g., a mobile device) to a second device (e.g., a MFP), according to an example of the present disclosure. The method 700 is implemented, for example, by the processor 102 of the authentication server 140 as depicted in FIG. 1.

An identification value and an encryption key may be generated by one of the second device 130 or the authentication server 140. As discussed above, the identification value may be a string created using a cryptographically secure pseudo-random number generator. The authentication server 140 may encode the identification value and the encryption key in a bar code for display in a UI of the second device. According to an example, both the identification value and the encryption key are encoded in a QR code that is transmitted to the client device 130 to be embedded in a login page that is displayed on the UI of the second device. The login page, for instance, may be generated on the client device 130. The authentication server 140 may transmit a textual representation of the identification value and the encryption key to the second device for storage in a local memory, such that the textual representation is only visible to the second device and is not included in the login page. According to another example, the authentication server 140 may encode the identification value and the encryption key in a datagram for broadcast in the second device. The datagram, for instance, may include a near field communication (NFC) datagram.

In a separate and prior process, the authentication server 140 may have authenticated the first device. For example, the authentication server 140 may have received user credentials from the first device, validated the user credentials, created an active authentication session token, and transmitted the created active authentication session token to the first device for storage in a local memory of the first device. Accordingly, when the first device subsequently scans the bar code and transmits data to the authentication server 140, the authentication server 140 may determine whether the first device was previously authenticated and may determine whether the first device supports the transfer of the active authentication session based, for instance, on a flag set in the first device.

In block 710, the authentication server 140 may receive the active authentication session token from the local memory of the first device together with the identification value and the encryption key that was extracted from the bar code by the first device if the first device is authenticated and supports the transfer of the active authentication session.

At block 720, the authentication server 140 may derive a new authentication session token for the second device based on the active authentication session token. The new authentication session token may be encrypted as shown in block 730. The encrypted version of the new authentication session token may be stored in in session storage of the authentication server 140 in association with a locator key based on the identification value, as shown at block 740. The new authentication session token, for example, is encrypted using the encryption key received from the first device. Alternatively, the encrypting of the new authentication token may be optional. That is, for instance, the new authentication session token may be stored in a row of a session table without an encryption according to an example.

At block 750, the authentication server 140 may transmit the encrypted new authentication session ken to the second device responsive to verifying a query regarding an existence of the locator key in the session storage by the second device. According to an example, when polled or inquired by the second device, the authentication server 140 may identify the existence of the locator key in the session table. Responsive to identifying the existence of the locator key, the authentication server 140 may transmit the new authentication session token that is associated with the locator key to the second, device and delete the locator key and the new authentication session token from the session table. Accordingly, as shown in method 700, the authentication server 140 has transferred the active authentication session from the first device to the second device, according to an example of the present disclosure.

With reference to FIG. 8, there is shown a flow chart of a method 800 for client device 130 (e.g. MFP) to receive an active authentication session from a first device (e.g., a mobile device) and an authentication server 140, according to an example of the present disclosure. The client device 130 may provide access to a cloud-based authentication application. The method 800 is implemented, for example, by the processor 202 of the client device 130 as depicted in FIG. 2A.

At block 810, the client device 130 may generate an identification value and an encryption key. According to an example, the generated encryption key may be stored in a local memory of the client device 130. The generated encryption key, however, may be deleted in response to a reset of the client device, an exit from an authentication application of the client device, or a closing of a browser of a user interface of the client device.

As shown in block 820, the generated identification value and the encryption key may be outputted, e.g., displayed as a bar code in a UI of the client device 130. At this point, another authenticated device may scan the displayed bar code to extract the identification value and the encryption key, and transmit the extracted data together with an active authentication session token of the authenticated device to an authentication server 140. The transmitted active authentication session token may be stored in a row of a session table at the authentication server 140 using a locator key based on the generated identification value.

At block 830, the client device 130 may inquire the authentication server 140 to determine whether the locator key is stored in session storage of the authentication server. In other words, the client device 130 may continuously poll the session storage to determine if a user of the authenticated device is logged in and authenticated on the authenticated device. According to an example, the locator key is associated with a client device authentication session token that is derived from an active authentication session token of the authenticated device. The client device authentication session token may be encrypted by the authentication server 140 using the generated encryption key prior to storing in the session storage.

At block 840, the client device 130 may receive the encrypted client device authentication session token from the authentication server in response to a determination that the locator key is stored in the session storage. The encrypted client device authentication session token, for example, is derived from the active authentication session token and generated according to the specifications of the client device 130. The client device 130 may decrypt the encrypted client device authentication session token using the encryption key that was stored in its local memory.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method for transferring an active authentication session from a first device to a second device, comprising:
   receiving, by a server, an active authentication session token, an identification value, and an encryption key from the first device, wherein the first device is to obtain the identification value and the encryption key from the second device;
   deriving, by the server, a new authentication session token for the second device based on the active authentication session token, the new authentication session token differing from the active authentication session token;
   encrypting, by the server, the new authentication session token with the encryption key received from the first device;

storing, by the server, the encrypted new authentication session token in session storage of the server in association with a locator key based on the identification value;

receiving, by the server, a query by the second device regarding an existence of the locator key in the session storage; and responsive to verifying the existence of the locator key in the session storage, transmitting, by the server, the encrypted new authentication session token to the second device.

2. The method of claim 1, further comprising:
receiving user credentials from the first device;
authenticating the user credentials;
creating the active authentication session token; and
transmitting the active authentication session token to the first device for storage in a local memory of the first device.

3. The method of claim 1, further comprising:
encoding the identification value and the encryption key in a bar code for output by the second device;
transmitting the bar code to the second device to embed into a hypertext transfer protocol (HTML) login page on the second device;
transmitting a textual representation of the identification value and the encryption key to the second device for storage in a local memory of the second device, wherein the textual representation is not included in the login page; and
deleting the locator key, the encryption key, and the new authentication session token from volatile memory.

4. The method of claim 1, wherein transmitting the encrypted new authentication session token to the second device further comprises:
identifying the locator key in the session storage;
transmitting the new authentication session token that is associated with the locator key in the session storage to the second device; and
deleting the locator key and the new authentication session token from session storage.

5. The method of claim 1, further comprising:
determining whether the first device was previously validated by the authentication server; and
identifying from a flag set in the first device whether the first device supports the transfer of the active authentication session.

6. The method of claim 3, wherein encoding the identification value and the encryption key further comprises encoding the identification value and the encryption key in a quick response (QR) code.

7. The method of claim 1, wherein encrypting the new authentication session token further comprises encrypting the new authentication session token using the received encryption key.

8. A non-transitory computer readable medium on which is stored machine readable instructions for transferring an active authentication session of a first device with an authentication server to a second device, the machine readable instructions executable by a processor to:
obtain an active authentication session token, an identification value, and an encryption key from the first device, wherein the first device is to acquire the identification value and the encryption key from an output of the second device;
generate a new authentication session token for the second device based on the active authentication session token, the new authentication session token differing from the active authentication session token;
encrypt the new authentication session token with the encryption key received from the first device,
store the encrypted new authentication session token in session storage of the authentication server in association with a locator key based on the identification value;
receive a query by the second device regarding an existence of the locator key in the session storage; and
responsive to the existence of the locator key in the session storage being verified, send the encrypted new authentication session token to the second device.

9. The non-transitory computer readable medium of claim 8, wherein the machine readable instructions are further executable by the processor to:
receive user credentials from the first device;
validate the user credentials;
create the active authentication session token; and
transmit the active authentication session token to the first device for storage in a local memory of the first device.

10. The non-transitory computer readable medium of claim 8, wherein to send the encrypted new authentication session token to the second device, the machine readable instructions are further executable by the processor to:
identify the locator key in the session storage;
transmit the obtained encryption key and the encrypted new authentication session token that are associated with the locator key to the second device; and
delete the locator key, the encryption key, and the new authentication session token from the session storage.

11. The non-transitory computer readable medium of claim 8, wherein the format for output by the second device comprises a datagram, and wherein the datagram is a near field communication (NFC) datagram.

* * * * *